United States Patent
Mizuno et al.

(10) Patent No.: US 7,637,516 B2
(45) Date of Patent: Dec. 29, 2009

(54) VEHICULAR SUSPENSION SYSTEM

(75) Inventors: Kazuyuki Mizuno, Nishikamo-gun (JP); Masaaki Tabata, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 513 days.

(21) Appl. No.: 10/592,459

(22) PCT Filed: Feb. 25, 2005

(86) PCT No.: PCT/JP2005/003708

§ 371 (c)(1),
(2), (4) Date: Sep. 11, 2006

(87) PCT Pub. No.: WO2005/087522

PCT Pub. Date: Sep. 22, 2005

(65) Prior Publication Data

US 2007/0187918 A1 Aug. 16, 2007

(30) Foreign Application Priority Data

Mar. 17, 2004 (JP) .............................. 2004-076944

(51) Int. Cl.
*B60G 9/04* (2006.01)
(52) U.S. Cl. .............................. 280/124.157
(58) Field of Classification Search ............ 280/124.16, 280/124.161, 124.157, 124.159, 5.504, 5.506, 280/5.507, 5.508, 5.512, 5.513, 5.515
See application file for complete search history.

(56) References Cited

U.S. PATENT DOCUMENTS

| | | | |
|---|---|---|---|
| 3,008,729 A | 11/1961 | Muller et al. | |
| 3,024,037 A | 3/1962 | Fiala et al. | |
| 3,752,497 A | 8/1973 | Enke et al. | |
| 3,778,081 A | 12/1973 | Takahashi et al. | |
| 3,895,816 A | 7/1975 | Takahashi et al. | |
| 4,371,182 A | 2/1983 | Brown | |
| 5,265,913 A | 11/1993 | Scheffel | |

(Continued)

FOREIGN PATENT DOCUMENTS

DE 296 15 913 U1 2/1998

(Continued)

*Primary Examiner*—Faye M. Fleming
(74) *Attorney, Agent, or Firm*—Oliff & Berridge, PLC

(57) ABSTRACT

A suspension system for a vehicle, comprising a plurality of suspension cylinders such as shock absorbers (10, 12, 14, 16) which correspond to respective wheels of the vehicle and which have respective hydraulic chambers (28), and a control cylinder (48; 100) having a cylinder housing (52; 104), and a piston assembly (50; 102) which is fluid-tightly and slidably fitted in the cylinder housing and which includes a plurality of pistons (70, 72, 74, 76; 110, 112, 114) and at least one connecting rod (66, 68; 116, 118) connecting the plurality of pistons. The control cylinder has a plurality of hydraulic chambers (70, 72, 74, 76; 130, 132, 134, 136, 138, 140) to which are respectively connected the hydraulic chambers of the plurality of suspension cylinders. The plurality of pistons of the piston assembly include at least two pistons which have respective different diameters. The freedom in connection of the hydraulic chambers of the control cylinder to the suspension cylinders can be increased by arranging the control cylinder such that the pressure-receiving surface areas which receive hydraulic pressures in all of the hydraulic chambers are equal to each other.

10 Claims, 3 Drawing Sheets

U.S. PATENT DOCUMENTS

| | | | |
|---|---|---|---|
| 5,562,305 A * | 10/1996 | Heyring | 280/5.507 |
| 6,942,230 B1 | 9/2005 | Fontdecaba Buj | |
| 7,360,777 B2 * | 4/2008 | Mizuno et al. | 280/124.157 |
| 2004/0169345 A1 | 9/2004 | Fontdecaba Buj | |

FOREIGN PATENT DOCUMENTS

| | | |
|---|---|---|
| EP | 1 231 086 A1 | 8/2002 |
| GB | 2 238 990 A | 6/1991 |
| JP | A-49-116726 | 11/1974 |
| JP | 61-108686 U | 7/1986 |
| JP | A 8-132846 | 5/1996 |
| JP | A-2003-505297 | 2/2003 |
| WO | WO 03/022605 A2 | 3/2003 |

* cited by examiner

VEHICULAR SUSPENSION SYSTEM

TECHNICAL FIELD

The present invention relates in general to a vehicular suspension system, and more particularly to improvements in a suspension system of a type in which hydraulic chambers of a plurality of suspension cylinders are connected to respective hydraulic chambers of one control cylinder.

BACKGROUND ART

U.S. Pat. No. 3,024,037 discloses an example of a vehicular suspension system of the type described above. This vehicular suspension system includes four suspension cylinders which are provided for front left and right and rear left and right wheels of a vehicle, respectively, and which have four hydraulic chambers connected to respective four hydraulic chambers of a control cylinder. The control cylinder includes a piston assembly which consists of two pistons and a connecting rod connecting the two pistons and in which the two pistons and the connecting rod are fluid-tightly and slidably fitted in a cylinder housing. The two suspension cylinders provided for the front left and right wheels of the vehicle are connected to respective two inner hydraulic chambers which are formed between the respective two pistons and a partition wall through which the connecting rod fluid-tightly extends, while the two suspension cylinders provided for the rear left and right wheels are connected to respective two outer hydraulic chambers which are formed on axially outer sides of the respective two pistons which are remove from the connecting rod.

This vehicular suspension system is capable of preventing or restricting a pitching motion of the vehicle body such that a pitching moment acting on the vehicle body causes an equilibrium of hydraulic pressures acting on the piston assembly of the control piston in the respective opposite axial directions, so that the piston assembly is held stationary at its neutral position. In the event where one of the front left and right and rear left and right wheels runs over a raised portion of a roadway surface and moves upwardly toward the vehicle body, the piston assembly of the control cylinder is axially moved, permitting a comparatively easy upward movement of the wheel running on the raised portion, thereby effectively avoiding an undesirable motion of the vehicle body. Further, this vehicular suspension system is adjustable in its rolling rigidity on the front-wheel and rear-wheel sides, by suitably selecting a ratio of the diameter of the two pistons to the diameter of the connecting rod.

DISCLOSURE OF THE INVENTION

However, the vehicular suspension system described above suffers from a problem of limited freedom in design due to a limitation in the relationship among four pressure-receiving surfaces areas of the two pistons of the piston assembly of the control cylinder, which partially define the respective four hydraulic chambers and receive the hydraulic pressures in these hydraulic chambers. This limitation results from an arrangement of the piston assembly wherein the two pistons have the same diameter and the connecting rod fluid-tightly extends through the partition wall. The present invention was made in view of this problem, and has an object of improving the freedom of design of a vehicular suspension system including a control cylinder.

The object indicated above may be achieved according to the principle of this invention, which provides a suspension system for a vehicle, comprising a plurality of suspension cylinders which correspond to respective wheels of the vehicle and which have respective hydraulic chambers, and a control cylinder having a cylinder housing, and a piston assembly which is fluid-tightly and slidably fitted in the cylinder housing and which includes a plurality of pistons and at least one connecting rod connecting the plurality of pistons, the control cylinder having a plurality of hydraulic chambers to which the hydraulic chambers of the plurality of suspension cylinders are respectively connected, characterized in that the plurality of pistons of the piston assembly of the control cylinder include at least two pistons which have respective different diameters.

The suspension cylinders may be shock absorbers, or hydraulic cylinders of a simple construction. Where each suspension cylinder is a shock absorber, one of two hydraulic chambers of the shock absorber is connected to a corresponding one of the hydraulic chambers of the control cylinder. Where each suspension cylinder is a simple hydraulic cylinder, this hydraulic cylinder is preferably connected in series with a mechanical spring device, a pneumatic spring device or any other elastic-force generating device arranged to generate an elastic or resilient force. The cylinder housing of the control cylinder may or may not have a partition wall formed between the adjacent two pistons. Where the piston assembly of the control cylinder has three or more pistons, the partition wall may or may not be formed between the two pistons of each of all pairs of adjacent pistons of the piston assembly, or between the two pistons of each of selected at least one of the pairs.

In the vehicular suspension system of the present invention, the plurality of pistons of the piston assembly of the control cylinder include at least two pistons having respective different diameters. This arrangement increases the freedom of design of the suspension system. Where the piston assembly consists of two pistons and one connecting rod connecting the two pistons, and the cylinder housing does not have a partition wall between the two pistons, for example, the piston assembly and the cylinder housing cooperate to define two outer hydraulic chambers and one inner hydraulic chamber. The control cylinder thus constructed may be used such that the two outer hydraulic chambers formed on the outer sides of the respective two pistons are connected to respective two suspension cylinders, while the one inner hydraulic chamber is connected to a suitable pressure control device, for example. This manner of use of the control cylinder is effective particularly where the two suspension cylinders have different hydraulic pressures.

For instance, the inner hydraulic chamber of the control cylinder is connected to a suitable hydraulic pressure source, and the hydraulic pressure to be applied to the inner hydraulic chamber from the hydraulic pressure source is controlled to control the operating characteristics of the two suspension cylinders connected to the respective two outer hydraulic chamber. Where the inner hydraulic chamber is connected to a reservoir, the piston assembly is moved to a position of equilibrium of two forces which are represented by the hydraulic pressures in the two outer hydraulic chambers multiplied by the respective different pressure-receiving surfaces of the two pistons which partially define the two outer hydraulic chambers. In this case, the hydraulic pressures in the hydraulic chambers of the two suspension cylinders can be controlled. For instance, the pressure-receiving surface areas of the two pistons may be determined in inverse proportion to the loads acting on the respective two suspension cylinders in the normal state of the vehicle. In this instance, the piston assembly of the control cylinder is held at its position of equilibrium in the normal state of the vehicle, and is moved when the loads acting on the two pistons change from the normal values in the normal state of the vehicle, that is, when the vehicle state changes from its normal state. As a result of the movement of the piston assembly, a distance between a heel-side member and a body-side members of the vehicle to which each of the two suspension cylinders is fixed is changed such that the distance of the suspension cylinder the load of which is increased is reduced, causing an upward movement of the corresponding wheel of the vehicle, while the distance of the other suspension cylinder the load of which is reduced is increased, causing a downward movement of the corresponding wheel.

According to a first preferred form of the suspension system of the present invention, the piston assembly includes a first piston, a second piston and a third piston which are arranged in series with each other in an axial direction of the control cylinder, a first connecting rod connecting the first and second pistons, and a second connecting rod connecting the second and third pistons, the plurality of hydraulic chambers of the control cylinder including a first hydraulic chamber formed on one side of the first piston which is remote from the second piston, a second hydraulic chamber formed between the first and second pistons, a third hydraulic chamber formed between the second and third pistons, and a fourth hydraulic chamber formed on one side of the third piston which is remote from the second piston, and wherein the second piston has a diameter different from a diameter of at least one of the first and third pistons.

The diameter of the second piston may be larger or smaller than the diameter of at least one of the first and second pistons. The first and third pistons may have the same diameter. In this case, the diameter of the second piston may be larger than the diameter of the first and third pistons. The two adjacent pistons having the respective different diameters have mutually opposed inner pressure-receiving surfaces which partially define an inner hydraulic chamber (one of the above-indicated second and third hydraulic chambers) and which have respective different areas. Two forces based on the hydraulic pressure in the above-indicted inner hydraulic chamber respectively act on the opposed inner pressure-receiving surfaces of the two adjacent pistons, in the respective opposite axial directions of the control cylinder. The force acting in one direction on the inner pressure-receiving surface of one of the two adjacent pistons which has the larger diameter is larger than the force acting in the opposite direction on the pressure-receiving surface of the other piston having the smaller diameter. Accordingly, the effective area of the pressure-receiving surface of the inner hydraulic chamber formed between the two adjacent pistons, which surface receives the hydraulic pressure in the above-indicated one direction is equal to the pressure-receiving surface area of the piston having the larger diameter, minus the pressure-receiving surface area of the piston having the smaller diameter.

In the suspension system according to the above-described first preferred form of this invention, the plurality of suspension cylinders may consist of four suspension cylinders respectively corresponding to a front left wheel, a front right wheel, a rear left wheel and a rear right wheel of the vehicle. In this case, the first, second, third and fourth hydraulic chambers of the control cylinder may be respectively connected to the four suspension cylinders. Alternatively, a plurality (two or three) of the first, second, third and fourth hydraulic chambers of the control cylinder may be respectively connected to the plurality of suspension cylinders, and at least one (one or two) of the other of the first, second, third and fourth hydraulic chambers may be connected to at least one of a pressure control device and a reservoir. In those cases, the freedom of design of the suspension system is significantly improved.

Where the piston assembly includes the first, second and third pistons indicated above, it is particularly desirable that the diameter of the second piston is larger than the diameter or diameters of the first and third pistons. The first and third pistons may have the same diameter or respective different diameters.

In one advantageous arrangement of the suspension system wherein the diameter of the second piston is larger than the diameter of the first and third pistons, the diameter of the second piston and the diameter of the first and third pistons are determined such that an effective area of a pressure-receiving surface of each of the second and third hydraulic chambers, which is equal to an area of opposite inner pressure-receiving surfaces of the second piston minus an area of inner pressure-receiving surfaces of the first and third pistons which cooperate with the opposite inner pressure-receiving surfaces of the second piston to partially define the second and third hydraulic cylinders, respectively, is equal to an area of outer pressure-receiving surfaces of the first and third hydraulic chambers which partially define the first and fourth hydraulic chambers, respectively. Namely, where the first and second pistons define opposite axial ends of the second hydraulic chamber in the axial direction of the control cylinder, while the second and third pistons define opposite axial ends of the third hydraulic chamber in the axial direction, the diameter of the second piston and the diameter of the first and third pistons are determined to satisfy the following equation: $S1=S2-S1=S3$, wherein $S1$, $S2$ and $S3$ respectively represent transverse cross sectional surface areas of the first, second and third pistons. In this case, the piston assembly of the control cylinder is held at its position neutral position when the hydraulic pressure in the first and fourth hydraulic chambers is equal to the hydraulic pressure in the second and third hydraulic chambers. It is noted that the term "transverse cross sectional surface area" of each piston or connecting rod, which is used herein, is interpreted to mean a surface area in cross section in a plane perpendicular to the axial direction of the piston or rod.

The suspension system according to the above-described advantageous arrangement has a significantly high degree of freedom in connection of the four hydraulic chambers of the control cylinder with the suspension cylinders. In one configuration of connection of the four hydraulic chambers to the suspension cylinders, the first and third hydraulic chambers are respectively connected to the suspension cylinders for the front left and right wheels of the vehicle, while the second and fourth hydraulic chambers are respectively connected to the suspension cylinders for the rear left and right wheels. In another configuration of connection, the second and fourth hydraulic chambers are respectively connected to the suspension cylinders for the front left and right wheels, while the first and third hydraulic chambers are respectively connected to the suspension cylinders for the rear left and right wheels. In a further configuration of connection, the first and fourth hydraulic cylinders are respectively connected to the suspension cylinders for the front left and right wheels, while the second and third hydraulic cylinders are respectively connected to the suspension cylinders for the rear left and right wheels. In a still further configuration of connection, the second and third hydraulic cylinders are respectively connected to the suspension cylinders for the front left and right wheels, while the first and fourth hydraulic cylinders are respectively connected to the suspension cylinders for the rear left and right wheels.

Where the first and third pistons have respective different diameters, the four hydraulic chambers may have respective different effective pressure-receiving surface areas, or two pairs of the four hydraulic chambers may have respective different effective pressure-receiving surface areas, the two hydraulic cylinders of each pair having the same effective pressure-receiving surface area.

According to a second preferred form of this invention, the piston assembly includes a first piston, a second piston and a third piston which are arranged in series with each other in an axial direction of the control cylinder, a first connecting rod connecting the first and second pistons, and a second connecting rod connecting the second and third pistons, and the cylinder housing has a first partition wall which is formed between the first and second pistons and through which the first connecting rod fluid-tightly and slidably extends, and a second partition wall which is formed between the second and third pistons and through which the second connecting rod fluid-tightly and slidably extends, and wherein the plurality of hydraulic chambers consist of a first hydraulic chamber formed on one side of the first piston which is remote from the first partition wall, a second hydraulic chamber formed between the first piston and the first partition wall, a third hydraulic chamber formed between the first partition wall and the second piston, a fourth hydraulic chamber formed between the second piston and the second partition wall, a fifth hydraulic chamber formed between the second partition wall and the third piston, and a sixth hydraulic chamber formed on one side of the third piston which is remote from the second partition wall.

In one advantageous arrangement of the suspension system according to the second preferred form of the invention, the first and third pistons has the same diameter, and the second piston has a diameter smaller than the diameter of the first and third pistons. Where the plurality of suspension cylinders consist of four suspension cylinders respectively corresponding to a front left wheel, a front right wheel, a rear left wheel and a rear right wheel of the vehicle, the four suspension cylinder may be connected to the control cylinder as described below. Namely, two of the four suspension cylinders are respectively connected to one and the other of the first and sixth hydraulic chambers, one of the other two of the four suspension cylinders is connected to the second and fourth hydraulic cylinders, while the other of the other two suspension cylinders is connected to the third and fifth hydraulic chambers. In this case, the diameter of the second piston, the diameter of the first and third pistons, and a diameter of the first and second connecting rods are determined to satisfy the following equation:

$$S1=S2+S4=S5+S3=S6, \text{ wherein}$$

S1: an area of an outer pressure-receiving surface of the first piston which partially defines the first hydraulic chamber, which area is equal to a transverse cross sectional surface area of the first piston;

S2: an area of an inner pressure-receiving surface of the first piston which partially defines the second hydraulic chamber, which area is equal to a transverse cross sectional surface area of the first piston minus a transverse cross sectional surface area of the first connecting rod;

S3: an area of one of opposite inner pressure-receiving surfaces of the second piston which partially defines the third hydraulic chamber, which area is equal to a transverse cross sectional surface area of the second piston minus a transverse cross sectional surface area of the first connecting rod;

S4: an area of the other of the opposite inner pressure-receiving surfaces of the second piston which partially defines the fourth hydraulic chamber, which area is equal to S3 and equal to the transverse cross sectional surface area of the second piston minus a transverse cross sectional surface area of the second connecting rod which is equal to that of the first connecting rod;

S5: an area of one of opposite inner pressure-receiving surfaces of the third piston which partially defines the fifth hydraulic chamber, which area is equal to S2 and equal to a transverse cross sectional surface area of the third piston minus the transverse cross sectional surface area of the second connecting rod; and S6: an area of the other of the opposite inner pressure-receiving surfaces of the third piston which partially defines the sixth hydraulic chamber, which area is equal to the transverse cross sectional area of the third piston.

Where the suspension system further comprises a pressure control device and/or a reservoir, and the plurality of suspension cylinders consist of four suspension cylinders respectively corresponding to a front left wheel, a front right wheel, a rear left wheel and a rear right wheel of the vehicle, the four suspension cylinders and at least one of the pressure control device and the reservoir may be connected to the control cylinder as described below. Namely, the four suspension cylinders are respectively connected to the first, second, fifth and sixth hydraulic chambers, and the third and fourth hydraulic chambers are connected to at least one of the pressure control device and the reservoir. In this case, the first and second connecting rods have the same diameter, and the diameter of the second piston, the diameter of the first and third pistons, and the diameter of the first and second connecting rods may be determined to satisfy the following equation:

$$S1=S2+S4=S5+S3=S6, \text{ wherein}$$

S1: an area of an outer pressure-receiving surface of the first piston which partially defines the first hydraulic chamber, which area is equal to a transverse cross sectional surface area of the first piston;

S2: an area of an inner pressure-receiving surface of the first piston which partially defines the second hydraulic chamber, which area is equal to a transverse cross sectional surface area of the first piston minus a transverse cross sectional surface area of the first connecting rod;

S3: an area of one of opposite inner pressure-receiving surfaces of the second piston which partially defines the third hydraulic chamber, which area is equal to a transverse cross sectional surface area of the second piston minus a transverse cross sectional surface area of the first connecting rod;

S4: an area of the other of the opposite inner pressure-receiving surfaces of the second piston which partially defines the fourth hydraulic chamber, which area is equal to S3 and equal to the transverse cross sectional surface area of the second piston minus a transverse cross sectional surface area of the second connecting rod which is equal to that of the first connecting rod;

S5: an area of one of opposite inner pressure-receiving surfaces of the third piston which partially defines the fifth hydraulic chamber, which area is equal to S2 and equal to a transverse cross sectional surface area of the third piston minus the transverse cross sectional surface area of the second connecting rod; and S6: an area of the other of the opposite inner pressure-receiving surfaces of the third piston which partially defines the sixth hydraulic chamber, which area is equal to the transverse cross sectional area of the third piston.

BEST MODE FOR CARRYING OUT THE INVENTION

Referring to the accompanying drawings, preferred embodiments of a vehicular suspension system of this invention will be described in detail.

Figure 1:
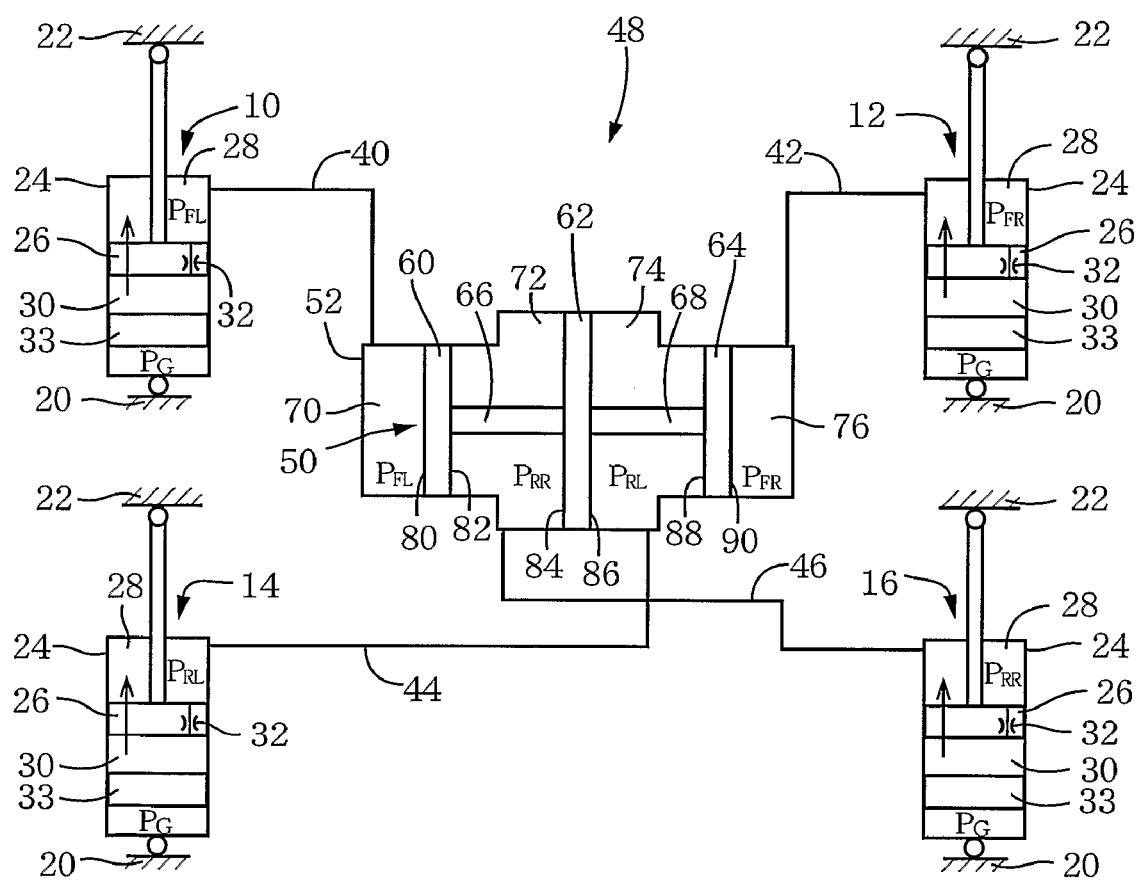
FIG. 1 is a view schematically showing a vehicular suspension system constructed according to a first embodiment of the present invention.

Reference is first made to FIG. 1 showing a vehicular suspension system constructed according to a first embodiment of the invention, which includes suspension cylinders in the form of four shock absorbers 10, 12, 14, 16 provided for respective front left and right and rear left and right wheels. Each of these four shock absorbers 10, 12, 14, 16 is interposed between a wheel-side member 20 and a body-side member 22, and includes a housing 24 and a piston 26 fluid-tightly and slidably fitted in the housing 24. The body-side member 22 is directly fixed to a body of a vehicle, and the wheel-side member 20 is indirectly fixed to the vehicle body and supports the corresponding wheel. In the present embodiment, the housing 24 is attached to the wheel-side member 20, while a piston rod fixed to the piston 26 is attached to the body-side member. 22. The piston 22 cooperates with the housing 24 to define two hydraulic chambers 28, 30 formed on respective opposite sides of the piston 22, and has a fluid passage for fluid communication between the two hydraulic chambers 28, 30. This fluid passage is provided with a flow restrictor or throttle 32, which restricts a flow of a hydraulic working fluid between the two hydraulic chambers 28, 30, and thereby restrict a speed of movement of the piston 26 relative to the housing 24, so that the shock absorber 10, 12, 14, 16 provides a damping force according to the restricted speed of the relative movement of the piston 26 and housing 24. The flow restrictor 32 is a fixed restrictor having a predetermined constant resistance to flows of the fluid therethrough. In the present embodiment wherein a control cylinder 48 is provided as described below in detail, the flow restrictor 48 has a comparatively small cross sectional surface area of fluid flow, so that the absorber exhibits a comparatively hard damping characteristic.

The four shock absorbers 10-16 are connected to a control cylinder 48 through respective fluid passages 40, 42, 44, 46. The control cylinder 48 includes a piston assembly 50 including three pistons, and a cylinder housing 52 in which the piston assembly 50 is fluid-tightly and slidably fitted. The three pistons of the piston assembly 50 consist of a first piston 60, a second piston 62 and a third piston 64, which are arranged in series with each other in this order of description in a right direction as seen in FIG. 1, in an axial direction of the control cylinder 48. The piston assembly 50 of the control cylinder 48 further includes a connecting rod 66 connecting the first and second pistons 60, 62, and a connecting rod 68 connecting the second and third pistons 62, 64. Thus, the three pistons 60, 62, 74 and the two connecting rods 66, 68 are connected in series with each other. to constitute the piston assembly 50

The cylinder housing 52 has a stepped cylinder bore consisting of a central large-diameter portion, and two small-diameter portions which are formed adjacent to the respective opposite axial ends of the central large-diameter portion and which have a smaller diameter than the large-diameter portion. The piston assembly 50 is received in this stepped bore of the cylinder housing 52, such that the piston assembly 50 cooperates with the stepped bore to define four hydraulic chambers: a first hydraulic chamber 70 formed on one side of the first piston 60 which is remote from the second piston 62; a second hydraulic chamber 72 formed between the first and second pistons 60, 62; a third hydraulic chamber 74 formed between the second and third pistons 62, 64; and a fourth hydraulic chamber 76 formed on one side of the third piston 64 which is remote from the second piston 62. The first piston 60 has an outer pressure-receiving surface 80 partially defining an outer hydraulic chamber in the form of the first hydraulic chamber 70, and an inner pressure-receiving surface 82 partially defining an inner hydraulic chamber in the form of the second pressure chamber 72. The second piston 62 has an inner pressure-receiving surface 84 partially defining the second hydraulic chamber 72, and an inner pressure-receiving surface 86 partially defining an inner hydraulic chamber in the form of the third hydraulic chamber 74. The third piston 64 has an inner pressure-receiving surface 88 partially defining the third hydraulic chamber 74, and an outer pressure-receiving surface 90 partially defining an outer hydraulic chamber in the form of the four hydraulic chamber 76.

The first hydraulic chamber 70 is connected through the fluid passage 40 to the hydraulic chamber 28 of the shock absorber 10 for the front left wheel, so that the outer pressure-receiving surface 80 receives a hydraulic pressure in the hydraulic chamber 28 of the shock absorber 10. The fourth hydraulic chamber 76 is connected through the fluid passage 42 to the hydraulic chamber 28 of the shock absorber 12 for the front right wheel, so that the outer pressure-receiving surface 90 receives a hydraulic pressure in the hydraulic chamber 28 of the shock absorber 12. In the present embodiment, the first and third pistons 60, 64 have the same diameter, and the outer pressure-receiving surfaces 80, 90 have the same pressure-receiving surface area.

The second hydraulic chamber 72 formed between the adjacent first and second pistons 60, 62 is connected through the fluid passage 46 to the hydraulic chamber 28 of the shock absorber 16 for the rear right wheel, and the opposed two inner pressure-receiving surfaces 82, 84 of the first and second pistons 60, 62 receive a hydraulic pressure in the shock absorber 16. A force based on the hydraulic pressure acting on the inner pressure-receiving surface 82 of the first piston 60 having a smaller diameter than the second piston 62 acts in the left direction as seen FIG. 1, while a force based on the hydraulic pressure acting on the inner pressure-receiving surface 84 of the second piston 62 acts in the right direction. Therefore, the second hydraulic chamber 72 of the piston assembly 50 has an effective pressure-receiving surface area which receives the hydraulic pressure acting on the piston assembly 50 in the right direction and which is equal to the area of the pressure-receiving surface 84 of the second piston 62 minus the area of the pressure-receiving surface 82 of the first piston 60.

The third hydraulic chamber 74 formed between the adjacent second and third pistons 62, 64 is connected through the fluid passage 44 to the hydraulic chamber 28 of the shock absorber 14 for the rear left wheel, and the opposed two inner pressure-receiving surfaces 86, 88 of the second and third pistons 62, 64 receive a hydraulic pressure in the shock absorber 14. A force based on the hydraulic pressure acting on the inner pressure-receiving surface 86 of the comparatively large second piston 62 acts in the left direction, while a force based on the hydraulic pressure acting on the inner pressure-receiving surface 88 of the comparatively small third piston 64 acts in the right direction. Therefore, the third hydraulic chamber 74 of the piston assembly 50 has an effective pressure-receiving surface area which receives the hydraulic pressure acting on the piston assembly 50 in the left direction and which is equal to the area of the pressure-receiving surface 86 of the second piston 62 minus the area of the pressure-receiving surface 88 of the third piston 64.

Thus, the piston assembly 50 receives a force acting thereon in the right direction, which is a product of the hydraulic pressure in the second hydraulic chamber 72 and the pressure in this chamber 72, and a force acting thereon in the left direction, which is a product of the hydraulic pressure in the third hydraulic chamber 74 and the pressure in this chamber 74.

Since the first and third pistons 60, 64 have the same diameter, the second and third hydraulic chambers 72, 74 of the piston assembly 50 have the same effective pressure-receiving surface area. In the present embodiment, the diameter of the second piston 62 is determined so that the effective pressure-receiving surface area of the second and third hydraulic chambers 72, 74 is equal to the pressure-receiving surface area of the first and fourth hydraulic chambers 70, 74, that is, equal to the area of the pressure-receiving surfaces 80, 90 of the first and third pistons 60, 64.

The hydraulic pressure in the hydraulic chamber 28 of each of the four shock absorbers 10-16 which is connected to the corresponding one of the first through fourth hydraulic chambers 70-76 is raised when a distance between the wheel-side member 20 and the body-side member 22 is increased. Each shock absorber 10-16 provides a comparatively large damping force since the control cylinder 48 is not connected to the hydraulic chamber 30 of each shock absorber 10-16, but is connected to the hydraulic chamber 28. Described in detail, the volume of the hydraulic chamber 28 will not change unless the fluid flows between the hydraulic chambers 28, through the flow restrictor 32. On the other hand, the volume of the hydraulic chamber 30 will change with a change of the volume of a gas chamber $P_G$ partially defined by a partition piston 33, which also partially defines the hydraulic chamber 30. Accordingly, the shock absorber 10-16 provides a larger damping force where the control cylinder 48 is connected to the hydraulic chamber 28 as in the present embodiment, than where the control cylinder 48 were connected to the hydraulic chamber 30.

An operation of the vehicular suspension system constructed as described above will be described. The piston assembly 50 receives a force based on the hydraulic pressure in the hydraulic chamber 28 of the shock absorber 10 for the front left wheel (a force represented by a product of the hydraulic pressure in the first hydraulic chamber 70 and the area of the outer pressure-receiving surface 80), a force based on the hydraulic pressure in the hydraulic chamber 28 of the shock absorber 16 for the rear right wheel (a force represented by a product of the hydraulic pressure in the second hydraulic chamber 72 and the effective pressure-receiving surface area of the chamber 72), a force based on the hydraulic pressure in the hydraulic chamber 28 of the shock absorber 12 for the front right wheel (a force represented by a product of the hydraulic pressure in the fourth hydraulic chamber 76 and the area of the outer pressure-receiving surface 90), and a force based on the hydraulic pressure in the hydraulic chamber 28 of the shock absorber 14 for the rear left wheel (a force represented by a product of the hydraulic pressure in the third hydraulic chamber 74 and the area of the effective pressure-receiving surface area of the chamber 74). The vehicle is designed symmetrically on its left and right sides in its mass distribution such that the loads acting on the front left and right wheels are equal to each other, while the loads acting on the rear left and right wheels are equal to each other, in a normal state of the vehicle. Accordingly, the piston assembly 50 is held at a neutral position in the normal state of the vehicle.

When the vehicle body has a pitching motion, which causes an increase in the distance between the wheel-side and body-side members 20, 22 on the front side of the vehicle, and a decrease in the distance on the rear side of the vehicle, for example, the hydraulic pressures in the hydraulic chambers 28 of the shock absorbers 10, 12 for the front left and right wheels are raised, while the hydraulic pressures in the hydraulic chambers 28 of the shock absorbers 14, 16 for the rear left and right wheels are lowered, so that the hydraulic pressures acting on the outer pressure-receiving surfaces 80, 90 are raised, while the hydraulic pressures acting on the inner pressure-receiving surfaces 84, 86 are lowered. The above-indicated symmetrical design of the vehicle maintains the piston assembly 50 at its neutral position even in the event of the pitching motion of the vehicle body, and each shock absorber 10-16 provides a sufficiently large damping force, while restricting a speed of the pitching motion of the vehicle body.

When the vehicle body has a rolling motion, which causes an increase in the distance between the wheel-side and body-side members 20, 22 on the left side of the vehicle, and a decrease in the distance on the right side of the vehicle, for example, the hydraulic pressures in the hydraulic chambers 28 of the shock absorbers 10, 14 for the front and rear left wheels are raised, while the hydraulic pressures in the hydraulic chambers 28 of the shock absorbers 12, 16 for the front and rear right wheels are lowered, so that the hydraulic pressures acting on the outer pressure-receiving surface 80 and the inner pressure-receiving surface 86 are raised, while the hydraulic pressures acting on the inner pressure-receiving surface 84 and the outer pressure-receiving surface 90 are lowered. Where the vehicle including the present suspension system is designed such that the hydraulic pressures in the hydraulic chambers 28 of the front left and right absorbers 10, 12 are substantially equal to each other, the piston assembly 50 is held stationary at its neutral position even in the event of the rolling motion, and the shock absorbers 10-16 operate as if they were independent of each other, such that each absorber 10-16 provides a sufficiently large damping force according to a relative movement of the wheel-side and body-side members 20, 22, while restricting a speed of the rolling motion of the vehicle body.

When one of the shock absorbers 10-16, for example, the shock absorber 10 for the front left wheel is subjected to a force that causes a decrease in the distance between the wheel-side and body-side members 20, 22, or when the two shock absorbers for the two diagonally opposed wheels are subjected to forces that causes these two wheels to move in the same direction toward or away from the vehicle body, for example, the shock absorbers 10, 16 for the front left and rear right wheels are subjected to forces that cause simultaneous occurrences of a decrease in the distance between the wheel-side and body-side members 20, 22 of those two shock absorbers 10, 16, the hydraulic pressures in the hydraulic chambers 28 of the shock absorbers 10, 16 are lowered, while the hydraulic pressures in the hydraulic chambers 28 of the shock absorbers 12, 14 are raised, so that the hydraulic pressures acting on the outer pressure-receiving surface 80 and the inner pressure-receiving surface 84 are lowered, while the hydraulic pressures acting on the inner pressure-receiving surface 86 and the outer pressure-receiving surface 90 are raised. As a result, a force acting on the piston assembly 50 in the left direction as seen in FIG. 1 becomes larger than a force acting on the piston assembly 50 in the right direction, so that the piston assembly 50 is axially moved in the left direction. Consequently, the volumes of the first and second hydraulic chambers 70, 72 are reduced, while the volumes of the third and fourth hydraulic chambers 74, 76 are increased. Accordingly, the hydraulic working fluid is discharged from the shock absorbers 12, 14 into the third and fourth hydraulic chambers 74, 76, while the working fluid is discharged from the first and second hydraulic chambers 70, 72 into the shock absorbers 10, 16. Thus, the vehicular suspension system is operated as if the shock absorbers 10, 16 and the shock absorbers 12, 14 were communicated with each other through the control cylinder 48, and the fluid flowed from the shock absorbers 12, 14 into the shock absorbers 10, 16. Accordingly, a difference between the hydraulic pressures in the hydraulic chambers 28, 30 of each of the shock absorbers 10-16 is reduced, and the velocity of the fluid flow through the flow restrictor 32 is lowered, so that the damping force produced by each shock absorber is reduced. Therefore, each of the wheels can be easily moved toward and away from the vehicle body, and the two diagonally opposed wheels can be easily moved in the upward or downward direction toward or away from the vehicle body, so that a vertical movement of the vehicle body can be effectively restricted.

Thus, the vehicular suspension system according to the present embodiment of the invention provides a sufficiently large damping force upon a rolling or pitching motion of the vehicle body, and a comparatively small damping force upon application of a force to one of the wheels in the vertical direction or forces to the two diagonally opposed wheels in the same upward or downward direction, so that the rolling or pitching motion can be effectively restricted while permitting a smooth vertical movement of one of the wheels or smooth concurrent movements of the two diagonally opposed wheels in the same upward or downward direction. The present suspension system does not require each of the shock absorbers 10-16 to be provided with a control device to control the damping force, for optimizing the damping force depending upon a specific change of attitude of the vehicle body or a specific state of undulation of the roadway surface.

Figure 2:
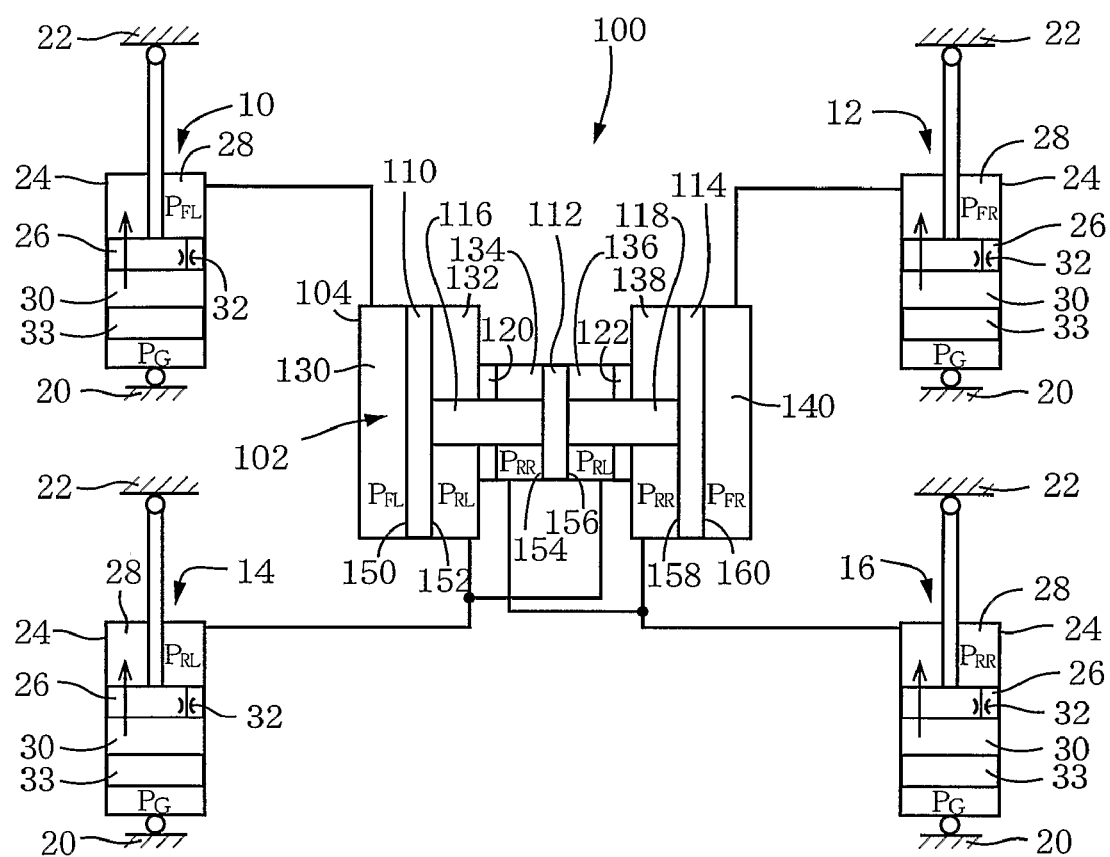
FIG. 2 is a view schematically showing a vehicular suspension system constructed according to a second embodiment of this invention.

In the vehicular suspension system of the first embodiment described above, the cylinder housing 52 of the control cylinder 48 does not have a partition wall between the first and second pistons 60, 62 or between the second and third pistons 62, 64. However, the cylinder housing may have at least one partition wall each interposed between adjacent two pistons. An example of this modification will be described by reference to FIG. 2 showing a vehicular suspension system constructed according to a second embodiment of the present invention. In the same embodiment, the same reference signs as used in the first embodiment will be used to identify the functionally corresponding elements, which will not be described to avoid redundancy of description.

The suspension system according to the second embodiment uses a control cylinder 100 including a piston assembly 102 including three pistons, and a cylinder housing 104 in which the piston assembly 102 is fluid-tightly and slidably received. The three pistons of the piston assembly 102 consist of a first piston 110, a second piston 112 and a third piston 114, which are connected to each other by two connecting rods 116, 118 and are fluid-tightly and slidably fitted in a stepped cylinder bore of the cylinder housing 104. The piston assembly 102 is constituted by the three pistons 110, 112, 114 and two connecting rods 116, 118. The cylinder housing 104 has a partition wall 120 formed between the first and second pistons 110, 112, and a partition wall 122 formed between the second and third pistons 112, 114.

The stepped bore and the partition walls 120, 122 of the cylinder housing 104 cooperates with the piston assembly 102 fitted in the stepped bore, to define a total of six hydraulic chambers: a first hydraulic chamber 130 formed on one side of the first piston 110 which is remote from the partition wall 120; a second hydraulic chamber 132 formed between the first piston 110 and the partition wall 120; a third hydraulic chamber 134 formed between the partition wall 120 and the second piston 112; a fourth hydraulic chamber 136 formed between the second piston 112 and the partition wall 122; a fifth hydraulic chamber 138 formed between the partition wall 122 and the third piston 114; and a sixth hydraulic chamber 140 formed on one side of the third piston 114 which is remote from the partition wall 122. The first piston 110 has an outer pressure-receiving surface 150 and an inner pressure-receiving surface 152, the second piston 112 has two inner pressure-receiving surfaces 154, 156, while the third piston 114 has an inner pressure-receiving surface 158 and an outer pressure-receiving surface 160.

The first hydraulic chamber 130 is connected to the hydraulic chamber 28 of the shock absorber 10 for the front left wheel, so that the outer pressure-receiving surface 150 receives the hydraulic pressure in the hydraulic chamber 28 of the shock absorber 10. The sixth hydraulic chamber 140 is connected to the hydraulic chamber 28 of the shock absorber 12 for the front right wheel, so that the outer pressure-receiving surface 160 receives the hydraulic pressure in the hydraulic chamber 28 of the shock absorber 12. In the present second embodiment, too, the first and third pistons 110, 114 have the same diameter, so that the outer pressure-receiving surfaces 150 and 158 have the same pressure-receiving surface area.

The second and fourth hydraulic chambers 132, 136 are connected to the hydraulic chamber 28 of the shock absorber 14 for the rear left wheel, so that the inner pressure-receiving surface 152 of the first piston 110 and the inner pressure-receiving surface 156 of the second piston 112, which are both located on the same right side of the pistons 110, 112, receive the hydraulic chamber 28 of the shock absorber 14. In the present embodiment, an area of the pressure-receiving surface 156 (which is equal to the transverse cross sectional surface area of the second piston 112 minus the transverse cross sectional surface area of the connecting rod 118) is equal to the transverse cross sectional surface area of the connecting rods 116, 118. The total pressure-receiving surface area which receives the hydraulic pressure in the hydraulic chamber 28 of the shock absorber 14 for the rear left wheel is a sum of an area of the inner pressure-receiving surface 152 of the first piston 110 (which is equal to the transverse cross sectional surface area of the first piston 110 minus the transverse cross sectional surface area of the connecting rod 116) and the area of the inner pressure-receiving surface 156 of the second piston 112 (which is equal to the transverse cross sectional surface area of the second piston 112 minus the transverse cross sectional surface area of the connecting rod 118). This sum is equal to the area of the outer pressure-receiving surfaces 150, 160. In the present specification, the term "transverse cross sectional surface area" of each piston or connecting rod is interpreted to mean a surface area in cross section in a plane perpendicular to the axial direction of the piston or rod.

Similarly, the total pressure-receiving surface area which receives the hydraulic pressure in the hydraulic chamber 28 of the shock absorber 16 for the rear right wheel is a sum of an area of the inner pressure-receiving surface 158 of the second piston 112 and an area of the inner pressure-receiving surface 158 of the third piston 114 and an area of the inner pressure-receiving surface 154 of the second piston 112. This sum is also equal to the area of the outer pressure-receiving surfaces 150, 160.

Accordingly, the piston assembly 102 receives forces acting thereon in the right direction as seen in FIG. 2, based on the hydraulic pressures in the shock absorbers 10, 16, and forces acting thereon in the left direction, based on the hydraulic pressures in the shock absorbers 12, 14. The present vehicular suspension system is also designed symmetrically on its left and right sides in its mass distribution, so that the piston assembly 102 is held at its neutral position in the normal state of the vehicle As in the suspension system of the first embodiment, the suspension system of the second embodiment is arranged such that the forces acting on the piston assembly 102 in the right direction based on the hydraulic pressures in the hydraulic chambers 28 of the shock absorbers 10 and 16 are equal to the forces acting on the piston assembly 102 in the left direction based on the hydraulic pressures in the hydraulic chambers 28 of the shock absorbers 12, 14. Namely, the pressure-receiving surface areas of the hydraulic chambers of the control cylinders 48, 100 which receive the hydraulic pressures in the four shock absorber 10-16 are all equal to each other, in the first and second embodiments. Further, the shock absorbers 10-17 and the other aspects of the suspension system of the second embodiment are identical with those of the first embodiment. Therefore, the suspension system of the second embodiment is operated in the same manner as described above with respect to the first embodiment, to restrict the rolling and pitching motions of the vehicle body, while permitting smooth vertical movement of one of the wheels, or smooth concurrent movements of the diagonally opposed wheels in the same upward or downward direction.

Since the first and second embodiments are arranged such that the pressure-receiving surface areas of the hydraulic chambers of the control cylinder 48, 100 which receive the hydraulic pressures in the four shock absorbers 10-16 are equal to each other, as described above, the hydraulic connections of the shock absorbers 10-16 to the control cylinder 48, 100 are not limited to those of the first and second embodiments, but may be modified as desired. This arrangement of the control cylinder 48, 100 permits a high degree of freedom in its hydraulic connections to the shock absorbers 10-16, depending upon the specific characteristic or configuration of the vehicle which is provided with the suspension system.

Figure 3:
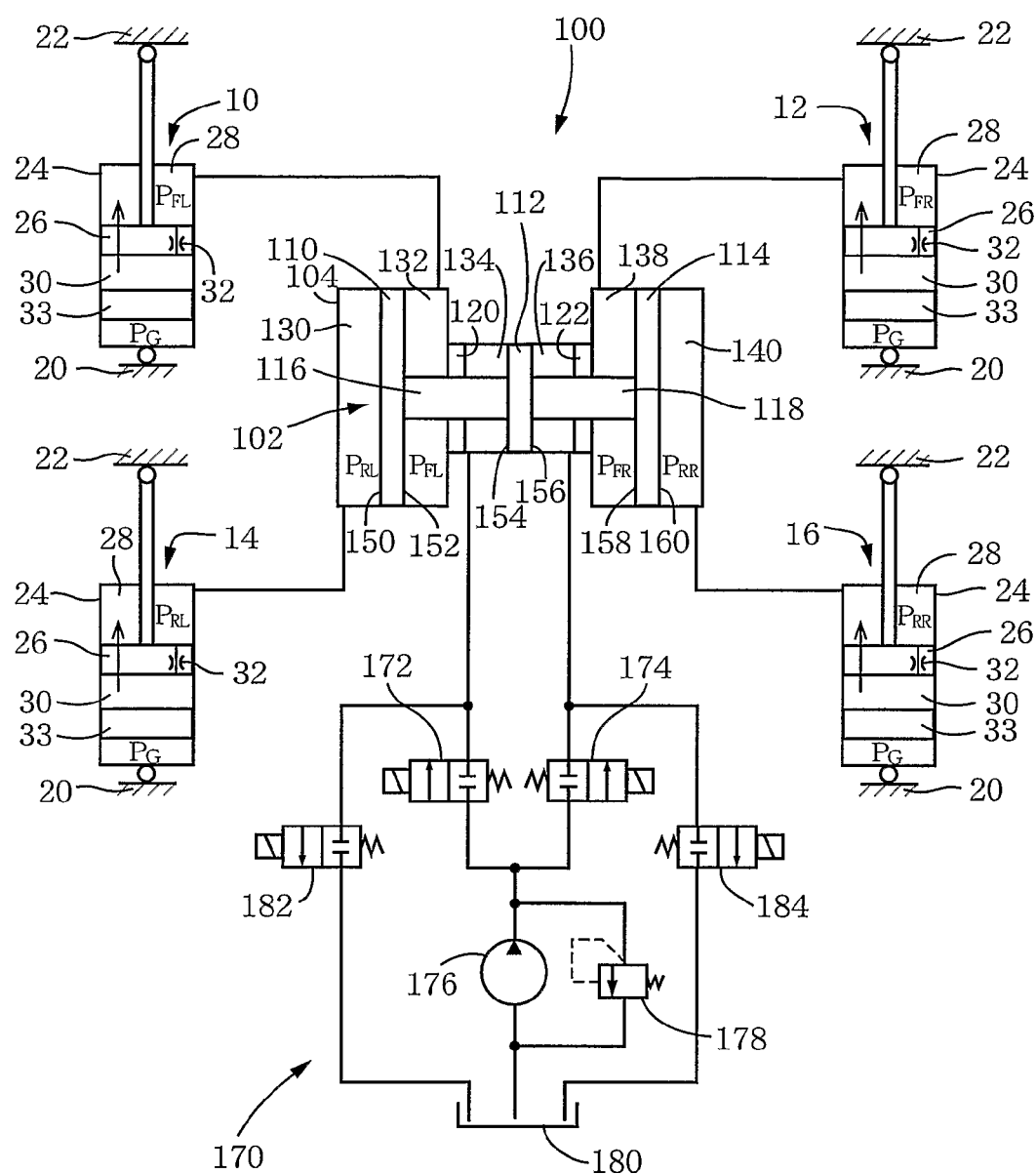
FIG. 3 is a view schematically showing a vehicular suspension system constructed according to a third embodiment of the invention.

While all of the hydraulic chambers of the control cylinder 48, 100 are connected to selected ones of the shock absorbers 10-16 for the front left and right and rear left and right wheels, some of the hydraulic chambers need not be connected to any of the shock absorbers 10-16, and may be connected to a pressure control device or a reservoir. An example of this modification as applied to the second embodiment is shown in FIG. 3 showing a third embodiment of this invention, wherein the third and fourth hydraulic chambers 134 and 136 of the control cylinder 100 are connected to a pressure control device 170. In this third embodiment, the first hydraulic chamber 130 is connected to the hydraulic chamber 28 of the shock absorber 14 for the rear left wheel, and the second hydraulic chamber 132 is connected to the hydraulic chamber 28 of the sock absorber 10 for the front left wheel. Further, the fifth hydraulic chamber 138 is connected to the hydraulic chamber 28 of the shock absorber 12 of the front right wheel, and the sixth hydraulic chamber 140 is connected to the hydraulic chamber 28 of the shock absorber 16 for the rear right wheel.

The pressure control device 170 includes a solenoid-operated shut-off valve 172 connected to the third hydraulic chamber 134, a solenoid-operated shut-off valve 174 connected to the fourth hydraulic chamber 136, a pump 176 and a pressure relief valve 178 which are connected in series with the shut-off valves 172, 174 and a reservoir 180 which are connected in parallel with each other, and two solenoid-operated shut-off valves 182, 184 which are connected in parallel with respective series connections of the shut-off valves 172, 174 and the pump 176 and which are connected to the reservoir 180. The pressure relief valve 178 is provided to prevent a rise of a delivery hydraulic pressure of the pump 176 beyond a predetermined upper limit. All of the solenoid-operated shut-off valves 172, 174, 182, 184 are normally-closed valves.

The hydraulic pressures in the hydraulic chambers 28 of the shock absorbers 10-16 act on the piston assembly 102, such that the piston assembly 102 is held at its neutral position in the normal state of the vehicle, as described above with respect to the second embodiments. Namely, the piston assembly 102 held at its neutral position maintains the vehicle body in its normal attitude, while restricting a pitching motion of the vehicle body, in the normal state of the vehicle, that is, as long as the hydraulic pressure in the third hydraulic chamber 134 and the hydraulic pressure in the fourth hydraulic chamber 136 are kept equal to each other. For instance, the piston assembly 102 is held at its neutral position while the third and fourth hydraulic chambers 134, 136 are held in communication with the reservoir 180 through the solenoid-operated shut-off valves 182, 184 of the pressure control device 170, which are held open. In this condition, the pressure control device 170 does not give any force resisting an axial movement of the piston assembly 102, so that the piston assembly 102 is freely movable to effectively restrict a transfer of a vertical movement of one of the four wheels or vertical movements of the diagonally opposed two wheels, to the vehicle body when the wheel or wheels in question is/are upwardly moved toward the vehicle body in the presence of a raised portion of the roadway surface, with a result of a decrease in the distance between the wheel-side and body-side members 20, 22 of the corresponding wheel or wheels.

The suspension system of the present third embodiment of FIG. 3 operates in substantially the same manner as the suspension system of the second embodiment of FIG. 2, where the pressure control device 170 is controlled to apply the same hydraulic pressure as that in the fluid chamber 28 of the shock absorber 10-16 to the third and fourth hydraulic chambers 134, 136.

Further, the rolling rigidities (damping characteristics) of the suspension system on its front-wheel and rear-wheel sides can be adjusted by suitably changing the hydraulic pressures in the third and fourth hydraulic chambers 134, 136 by controlling the pressure control device 170. When the loads acting on the right wheels are increased with a result of a rolling motion of the vehicle body that causes an increase in the hydraulic pressures in the fluid chambers 28 of the shock absorbers 10, 14 for the left wheels, for example, the shut-off valve 182 is operated to the open state to place the third hydraulic chamber 134 in communication with the reservoir 180, and the delivery pressure of the pump 176 is applied to the fourth hydraulic chamber 136. This control of the pressure control device 170 provides substantially the same result as obtained by increasing the area of the inner pressure-receiving surface 152 which partially defines the second hydraulic chamber 132 (by reducing the area of the inner pressure-receiving surface 158 which partially defines the fifth hydraulic chamber 138), so that the pistons 32 of the shock absorbers 10, 12 for the front wheels can be easily moved, with a result of a decrease in the rolling rigidity of the suspension system on its front-wheel side. If the shut-off valve 184 is operated to the open state to place the fourth hydraulic chamber 136 in communication with the reservoir 180, and the hydraulic pressure in the fourth hydraulic chamber 136 is increased by the delivery pressure of the pump 176, on the other hand, a resistance to movements of the pistons 32 of the shock absorbers 10, 12 for the front wheels is increased, with a result of an increase in the rolling rigidity of the suspension system on its front-wheel side. Thus, controlling the hydraulic pressure in the third hydraulic chamber 134 or fourth hydraulic chamber 136 is substantially equivalent to a change in the pressure-receiving surface areas of the piston assembly 102 which receive the hydraulic pressure in the first, second, fifth or sixth hydraulic chamber 130, 132, 138, 140. Namely, the operating characteristics of the present suspension system can be adjusted as desired by controlling the pressure control device 170.

The control cylinder 100 can be utilized to design a conventional control cylinder which has two pistons having the same diameter and which are fluid-tightly and slidably fitted in a cylinder bore and are connected to each other by a connecting rod which fluid-tightly and slidably extends a partition wall. That is, the control cylinder 100 is incorporated, in place of the conventional control cylinder, in a suspension system which is installed on a vehicle and which otherwise incorporates the conventional control cylinder. Tests are conducted on the vehicle, by controlling the pressure control device 170 of the control cylinder 100 to change the hydraulic pressures in the third and fourth hydraulic chambers 134, 136, in an effort to investigate various rolling control characteristics of the suspension system such as the front-rear distribution of the rolling rigidity, and to determine the optimum values of the hydraulic pressures in the third and fourth hydraulic chambers 134, 136 for obtaining the desired rolling control characteristics of the suspension system. On the basis of the thus obtained optimum hydraulic pressures in the third and fourth hydraulic chambers 134 136, a diametric relationship between the two pistons and the connecting rod of the conventional control cylinder can be determined so as to obtain the optimum rolling control characteristics such as the optimum front-rear distribution of the rolling rigidity.

In the three embodiments described above, the hydraulic chambers 28 of the shock absorbers 10-16 are connected to the control cylinder 48, 100. However, the hydraulic chambers 30 of the shock absorbers 10-16 may be connected to the control cylinder 48, 100. Further, the control cylinder 48, 100 may be connected to hydraulic cylinders not having a function of generating a damping force, for instance, to hydraulic cylinders having a function of generating an elastic or resilient force.

While the preferred embodiments of this invention have been described above by reference to the accompanying drawings, for illustrative purpose only, it is to be understood that the present invention may be embodied with various changes and modifications, which may occur to those skilled in the art.

The invention claimed is:

1. A suspension system for a vehicle, comprising:
   (a) four suspension cylinders respectively corresponding to a front left wheel, a front right wheel, a rear left wheel and a rear right wheel of the vehicle and having respective hydraulic chambers; and
   (b) a control cylinder having a cylinder housing and a piston assembly which is fluid-tightly and slidably fitted in said cylinder housing, the piston assembly including a first piston, a second piston and a third piston arranged in series with each other in an axial direction of said control cylinder and fixedly connected to each other, wherein:
      said first and third pistons have a same diameter while a diameter of said second piston is different from the diameter of said first and third pistons,
      said cylinder housing and said piston assembly define four groups of hydraulic chambers which consists of:
         one hydraulic chamber formed on one side of said first piston which is remote from said second piston,
         at least one hydraulic chamber formed between said first and second pistons,
         at least one hydraulic chamber formed between said second and third pistons, and
         one hydraulic chamber formed on one side of said third piston which is remote from said second piston,
      at least one hydraulic chamber belonging to each of said four groups of hydraulic chambers is connected to a corresponding one of said four suspension cylinders, and
      between said first and third pistons there are no hydraulic chambers, which are not connected to any of said four hydraulic chambers of said four suspension cylinders.

2. The suspension system according to claim 1, wherein the diameter of said second piston is larger than the diameter of said first and third pistons.

3. The suspension system according to claim 1, wherein said piston assembly has effective areas which are equal to each other, each of said effective areas being for each of said four groups of hydraulic chambers.

4. The suspension system according to claim 3, wherein said four groups of hydraulic chambers of said control cylinder consists of one chamber and the diameter of said second piston and the diameter of said first and third pistons are determined to satisfy the following equation:
   $S1=S2-S1=S3$, wherein $S1$, $S2$ and $S3$ respectively represent transverse cross sectional surface areas of said first, second and third pistons.

5. The suspension system according to claim 1, wherein said piston assembly further includes a first connecting rod connecting said first and second pistons, and a second connecting rod connecting said second and third pistons, and said cylinder housing has a first partition wall which is formed between said first and second pistons and through which said first connecting rod fluid-tightly and slidably extends, and a second partition wall which is formed between said second and third pistons and through which said second connecting rod fluid-tightly and slidably extends, and wherein said control cylinder has a first hydraulic chamber formed on one side of said first piston which is remote from said first partition wall, a second hydraulic chamber formed between said first piston and said first partition wall, a third hydraulic chamber formed between said first partition wall and said second piston, a fourth hydraulic chamber formed between said second piston and said second partition wall, a fifth hydraulic chamber formed between said second partition wall and said third piston, and a sixth hydraulic chamber formed on one side of said third piston which is remote from said second partition wall, two of said four suspension cylinders being respectively connected to one and the other of said first and sixth hydraulic chambers, one of the other two of said four suspension cylinders being connected to said second and fourth hydraulic cylinders, while the other of said other two suspension cylinders being connected to said third and fifth hydraulic chambers.

6. The suspension system according to claim 5, wherein the diameter of said second piston, the diameter of said first and third pistons, and a diameter of said first and second connecting rods are determined to satisfy the following equation:

$$S1=S2+S4=S5+S3=S6, \text{ wherein}$$

- S1: an area of an outer pressure-receiving surface of said first piston which partially defines said first hydraulic chamber, which area is equal to a transverse cross sectional surface area of said first piston;
- S2: an area of an inner pressure-receiving surface of said first piston which partially defines said second hydraulic chamber, which area is equal to a transverse cross sectional surface area of said first piston minus a transverse cross sectional surface area of said first connecting rod;
- S3: an area of one of opposite inner pressure-receiving surfaces of said second piston which partially defines said third hydraulic chamber, which area is equal to a transverse cross sectional surface area of said second piston minus a transverse cross sectional surface area of said first connecting rod;
- S4: an area of the other of said opposite inner pressure-receiving surfaces of said second piston which partially defines said fourth hydraulic chamber, which area is equal to S3 and equal to the transverse cross sectional surface area of said second piston minus a transverse cross sectional surface area of said second connecting rod which is equal to that of said first connecting rod;
- S5: an area of one of opposite inner pressure-receiving surfaces of said third piston which partially defines said fifth hydraulic chamber, which area is equal to S2 and equal to a transverse cross sectional surface area of said third piston minus the transverse cross sectional surface area of said second connecting rod; and
- S6: an area of the other of said opposite inner pressure-receiving surfaces of said third piston which partially defines said sixth hydraulic chamber, which area is equal to the transverse cross sectional area of said third piston.

7. The suspension system according to any one of claims 1, wherein pressures in hydraulic chambers of two of said four suspension cylinders respectively corresponding to said front left wheel and said front right wheel give said piston assembly forces in opposite directions to each other.

8. The suspension system according to claim 2, wherein said four groups of hydraulic chambers consist of a first hydraulic chamber formed on one side of said first piston which is remote from said second piston, a second hydraulic chamber formed between said first and second pistons, a third hydraulic chamber formed between said second and third pistons, and a fourth hydraulic chamber formed on one side of said third piston which is remote from said second piston.

9. The suspension system according to claim 8, wherein the two suspension cylinders respectively corresponding to said front left and rear left wheels are respectively connected to one and the other of said first and third hydraulic chambers, or to one and the other of said second and fourth hydraulic chambers, while the two suspension cylinders respectively corresponding to said front right and rear right wheels are respectively connected to one and the other of said fourth and second hydraulic chambers where the two suspension cylinders respectively corresponding to said front left and rear left wheels are respectively connected to said one and the other of said first and third hydraulic chambers, or to said one and the other of said first and third hydraulic chambers where the two suspension cylinders respectively corresponding to said front left and rear left wheels are respectively connected to one and the other of said fourth and second hydraulic chambers.

10. The suspension system according to claim 8, wherein said piston assembly has four effective pressure-receiving surface areas which respectively correspond to said first, second, third and fourth hydraulic chambers and which are equal to each other, and the two suspension cylinders respectively corresponding to said front left and rear left wheels are connected to respective two chambers of said first, second, third and fourth hydraulic chambers which two chambers generate respective two forces acting on said piston assembly in respective opposite axial directions, while the two suspension cylinders respectively corresponding to said front right and rear right wheels are connected to respective two other chambers of said first, second, third and fourth chambers which two other chambers generate respective two forces acting on the piston assembly in the respective opposite axial directions.

* * * * *